US009599865B2

(12) United States Patent
Ge et al.

(10) Patent No.: US 9,599,865 B2
(45) Date of Patent: Mar. 21, 2017

(54) LOW-FLICKER LIQUID CRYSTAL DISPLAY

(71) Applicant: Apple Inc., Cupertino, CA (US)

(72) Inventors: Zhibing Ge, Sunnyvale, CA (US); Chaohao Wang, Cupertino, CA (US); Cheng Chen, San Jose, CA (US); Kyung Wook Kim, Cupertino, CA (US); Ming-Chin Hung, Cupertino, CA (US); Paolo Sacchetto, Cupertino, CA (US); Shih Chang Chang, Cupertino, CA (US); Shih-Chyuan Fan Jiang, Taipei (TW); Shang-Chih Lin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 102 days.

(21) Appl. No.: 14/702,556

(22) Filed: May 1, 2015

(65) Prior Publication Data

US 2016/0209711 A1 Jul. 21, 2016

Related U.S. Application Data

(60) Provisional application No. 62/106,158, filed on Jan. 21, 2015.

(51) Int. Cl.
*G06F 3/041* (2006.01)
*G02F 1/1343* (2006.01)
(Continued)

(52) U.S. Cl.
CPC ...... *G02F 1/134309* (2013.01); *G02F 1/1343* (2013.01); *G02F 1/1368* (2013.01);
(Continued)

(58) Field of Classification Search
CPC ............. G02F 1/134309; G02F 1/1343; G02F 1/13439; G02F 1/133514; G02F 1/1368;
(Continued)

(56) References Cited

U.S. PATENT DOCUMENTS 6,900,852 B2   5/2005   Okada et al.
6,982,775 B2   1/2006   Lee et al.
(Continued)

FOREIGN PATENT DOCUMENTS

CN   1652296   8/2005
CN   1967360   5/2007
(Continued)

*Primary Examiner* — Tracie Y Green
(74) *Attorney, Agent, or Firm* — Treyz Law Group, P.C.; G. Victor Treyz; Joseph F. Guihan

(57) ABSTRACT

A display may have upper and lower display layers. A layer of liquid crystal material may be interposed between the upper and lower display layers. The display layers may have substrates. A thin-film transistor layer may have a layer of thin-film transistor structures on a substrate such as a clear glass layer. A planarization layer may be formed on the thin-film transistor structures. A transparent conductive layer may be formed on the planarization layer. The display may have a dielectric layer on the transparent conductive layer. Pixels may be formed in the display layers. The pixels may include pixel electrodes having fingers. The fingers may be formed on the dielectric layer. Trenches in the dielectric layer may be formed between the fingers. The trenches may extend to the transparent conductive layer or may be formed only partway into the dielectric layer.

22 Claims, 15 Drawing Sheets

(51) Int. Cl.
*G06F 3/147* (2006.01)
*G02F 1/1368* (2006.01)
*G02F 1/1335* (2006.01)
*G02F 1/1333* (2006.01)

(52) U.S. Cl.
CPC .... *G02F 1/13439* (2013.01); *G02F 1/133514* (2013.01); *G06F 3/147* (2013.01); *G02F 2001/133357* (2013.01); *G02F 2001/134372* (2013.01)

(58) Field of Classification Search
CPC ........ G02F 2001/134372; G02F 2001/133357; G06F 3/147
See application file for complete search history.

(56) References Cited

U.S. PATENT DOCUMENTS

| | | |
|---|---|---|
| 8,767,159 B2 | 7/2014 | Kimura |
| 2007/0128551 A1 | 6/2007 | Lee |
| 2007/0254415 A1 | 11/2007 | Oh et al. |
| 2009/0065767 A1 | 3/2009 | Reynolds et al. |
| 2014/0306900 A1 | 10/2014 | Son et al. |

FOREIGN PATENT DOCUMENTS

| | | |
|---|---|---|
| CN | 101145561 | 3/2008 |
| CN | 101577283 | 11/2009 |
| CN | 102347274 | 2/2012 |
| CN | 104252075 | 12/2014 |
| JP | 201023074 | 10/2010 |
| WO | 2014054482 | 4/2014 |

LOW-FLICKER LIQUID CRYSTAL DISPLAY

This application claims the benefit of provisional patent application No. 62/106,158 filed Jan. 21, 2015, which is hereby incorporated by reference herein in its entirety.

BACKGROUND

This relates generally to electronic devices, and more particularly, to electronic dev ices with displays.

Electronic devices often include displays. For example, cellular telephones and portable computers often include displays for presenting information to a user.

Liquid crystal displays contain a layer of liquid crystal material. Pixels in a liquid crystal display contain thin-film transistors and electrodes for applying electric fields to the liquid crystal material. The strength of the electric field in a pixel controls the polarization state of the liquid crystal material and thereby adjusts the brightness of the pixel.

The electric fields applied to the pixels in a liquid crystal display can cause charge to accumulate within the display. This can lead to undesired flickering of the display. The flickering may detract from the quality of images displayed on the display.

It would therefore be desirable to be able to provide improved displays for electronic devices such as displays with reduced charge accumulation and flickering.

SUMMARY

A display may have upper and lower display layers such as a color filter layer and a thin-film transistor layer. A layer of liquid crystal material may be interposed between the upper and lower display layers. The display layers may have substrates.

A thin-film transistor layer may have a layer of thin-film transistor structures on a substrate such as a clear glass layer. A planarization layer may be formed on the thin-film transistor structures. A common voltage layer such as a transparent conductive oxide or other transparent conductive layer may be formed on the planarization layer. The display may have a dielectric layer on the transparent conductive layer.

Pixels may be formed in the display layers. The pixels may include pixel electrodes having fingers. The fingers may be formed on the dielectric layer. Trenches in the dielectric layer may be formed between the fingers. The trenches may extend completely to the transparent conductive layer or may be formed only partway into the dielectric layer. The presence of the trenches may reduce the resistance of the dielectric layer between the fingers and thereby help reduce charge accumulation and display flickering.

DETAILED DESCRIPTION

Electronic devices may include displays. The displays may be used to display images to a user. Illustrative electronic devices that may be provided with displays are shown in FIGS. 1, 2, 3, and 4.

Figure 1:
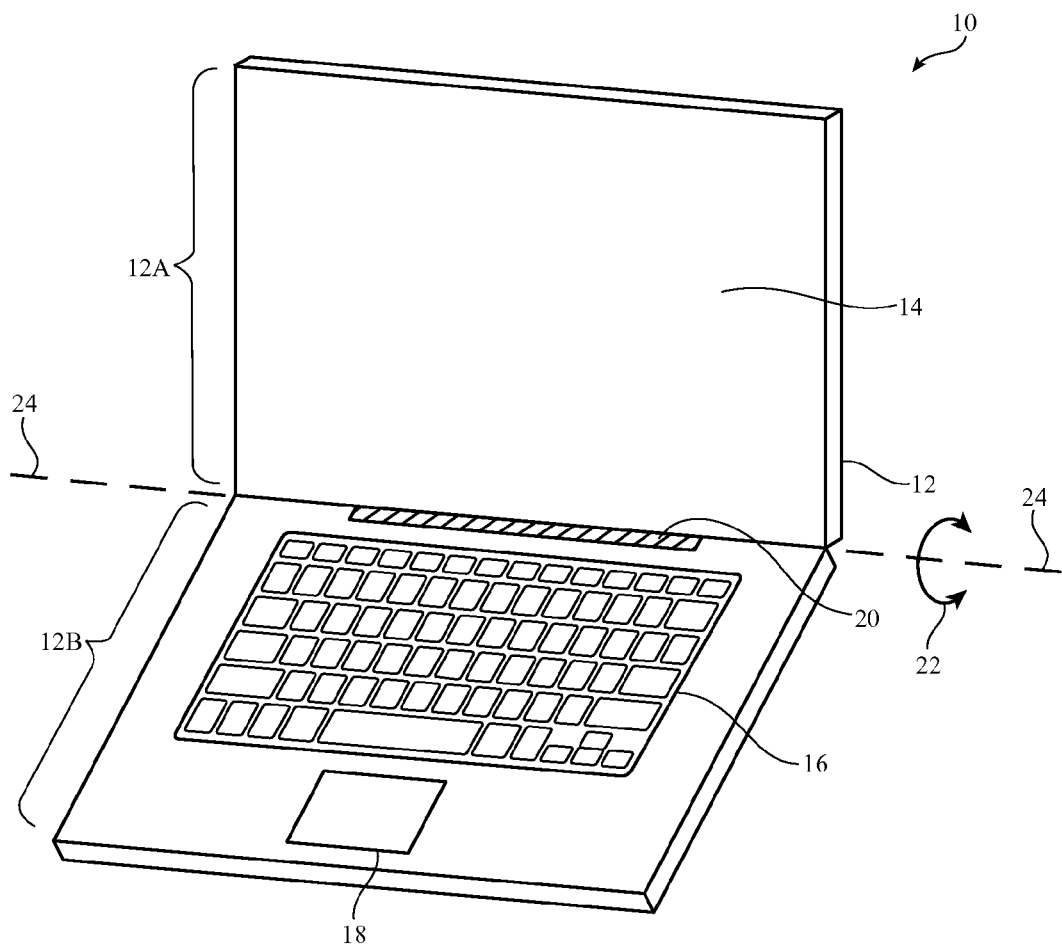
FIG. 1 is a perspective view of an illustrative electronic device such as laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
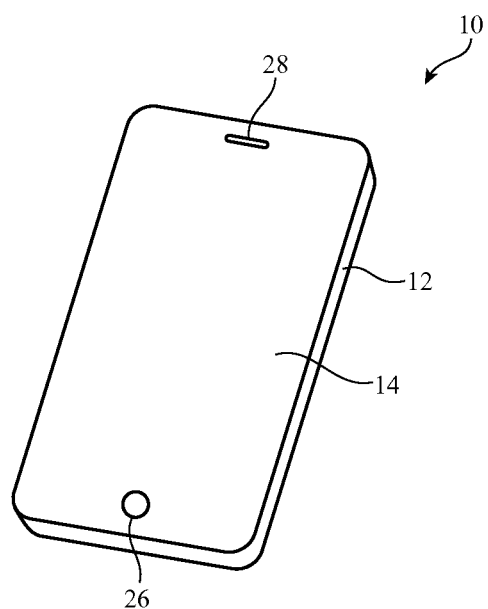
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
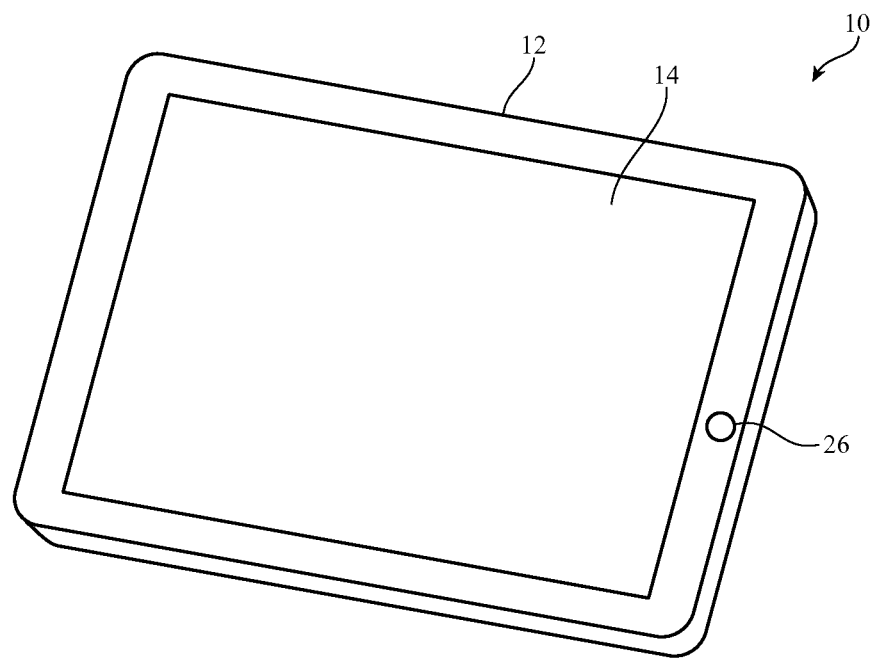
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
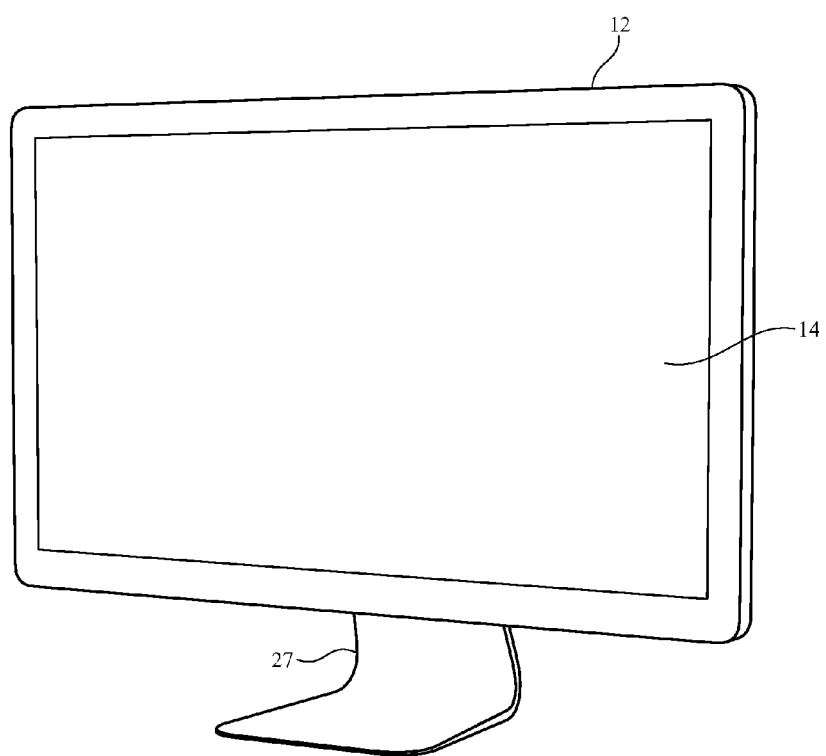
FIG. 4 is a perspective view of an illustrative electronic device such as a computer display with display structures in accordance with an embodiment.

FIG. 4 shows how electronic device 10 may be a computer display or a computer that has been integrated into a computer display. With this type of arrangement, housing 12 for device 10 may be mounted on a support structure such as stand 27 or stand 27 may be omitted (e.g., to mount device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a computer display that does not contain an embedded computer, a gaming device, a navigation device, an embedded system such as a system in which electronic equipment with a display is mounted in a kiosk or automobile equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include pixels formed from liquid crystal display (LCD) components. A display cover layer may cover the surface of display 14 or a display layer such as a color filter layer or other portion of a display ma be used as the outermost (or nearly outermost) layer in display 14. The outermost display layer may be formed from a transparent glass sheet, a clear plastic layer, or other transparent member.

Figure 5:
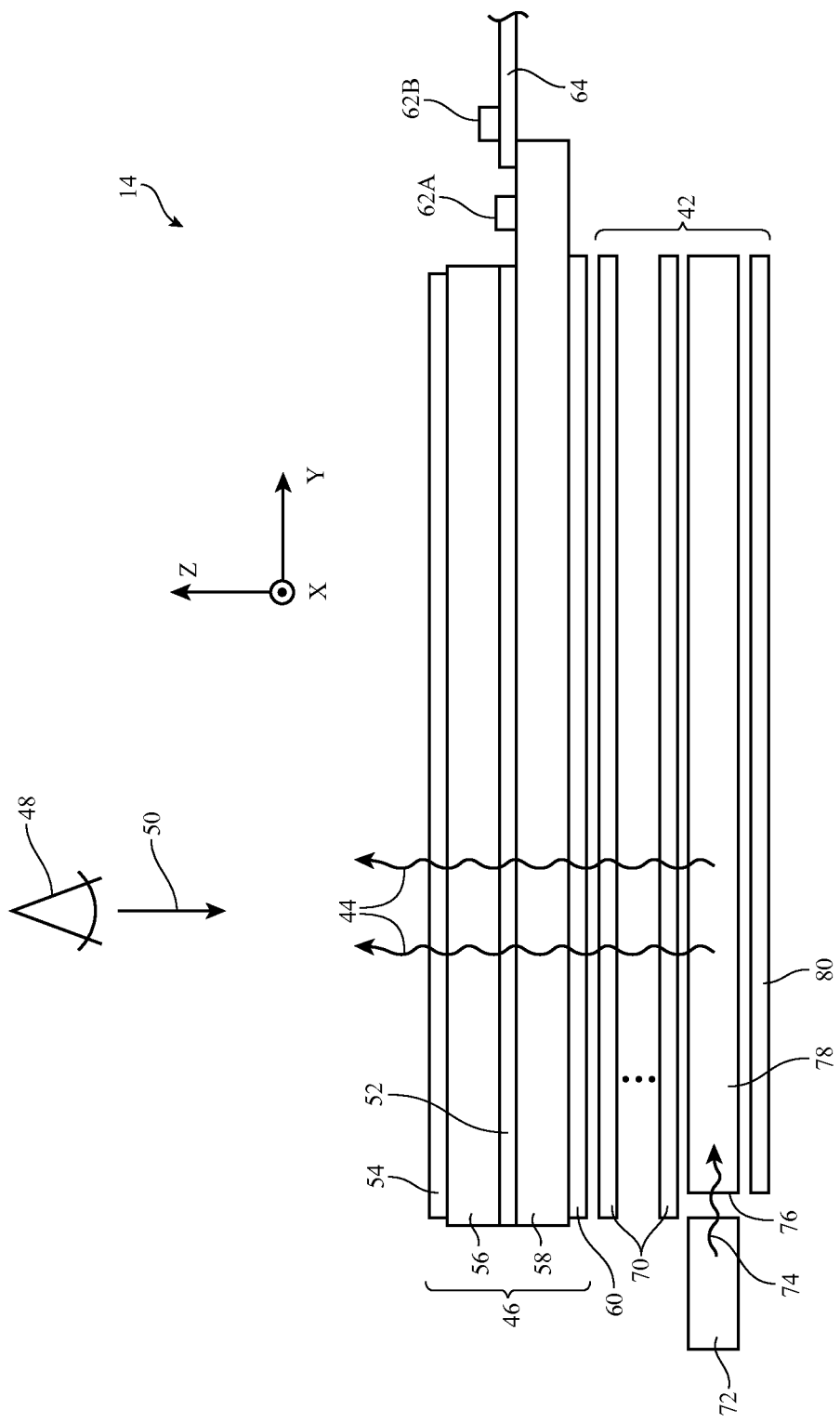
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an at of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of flight guide plate 78. Light source 72 may be located at the left of light guide plate 78 as shown in FIG. 5 or may be located along the right edge of plate 78 and/or other edges of plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of plastic covered with it dielectric mirror thin-film coating.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. If desired, films such as compensation films may be incorporated into other layers of display 14 (e.g., polarizer layers).

Figure 6:
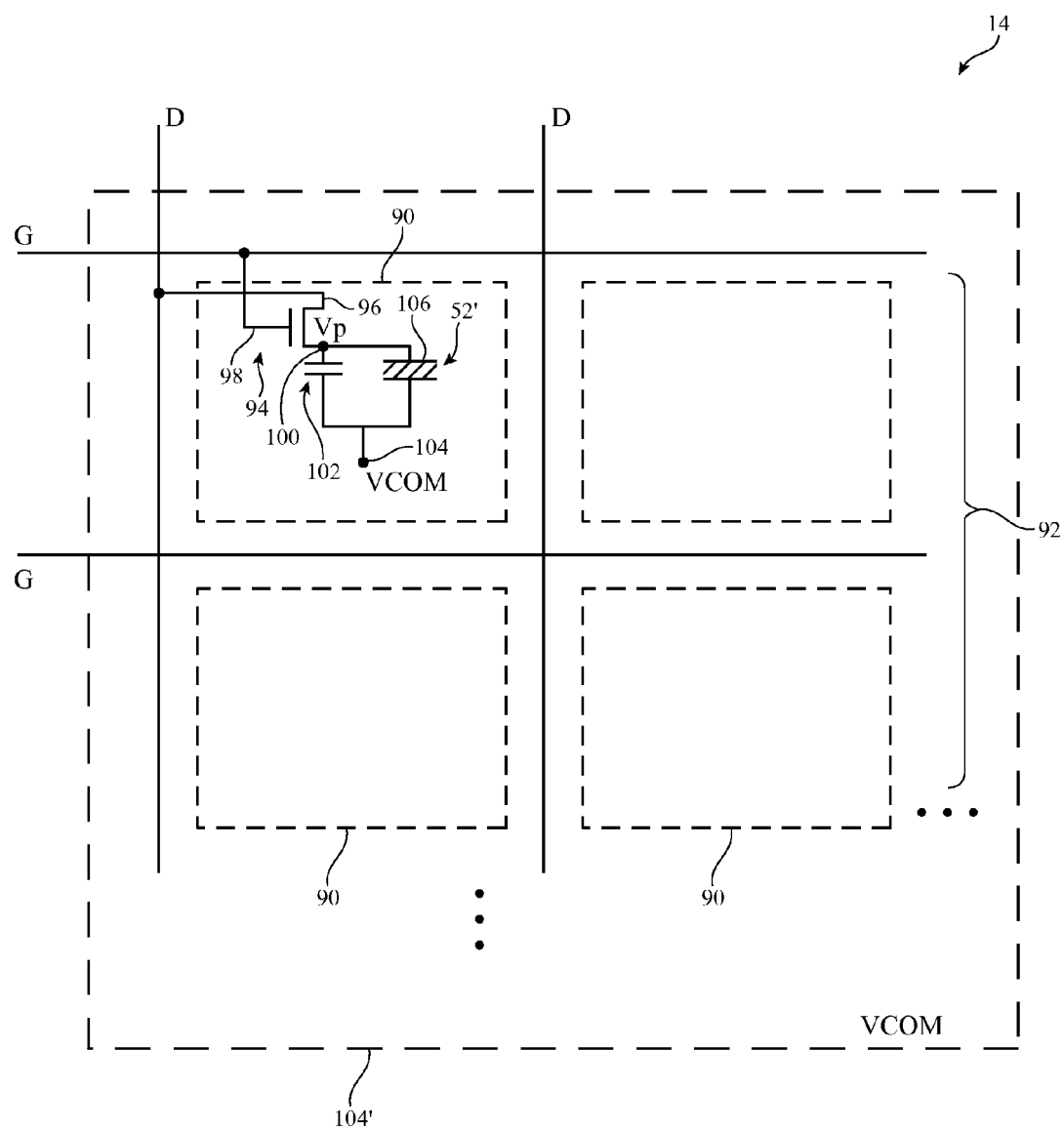
FIG. 6 is a top view of portion of an array of pixels in a display in accordance with embodiment.

As shown in FIG. 6, display 14 may include an array of pixels 90 such as pixel array 92. Pixel array 92 may be controlled using control signals produced by display driver circuitry. Display driver circuitry may be implemented using one or more integrated circuits (ICs) and/or thin-film transistors or other circuitry.

During operation of device 10, control circuitry in device 10 such as memory circuits, microprocessors, and other storage and processing circuitry may provide data to the display driver circuitry. The display driver circuitry may convert the data into signals for controlling pixels 90 of pixel array 92.

Pixel array 92 may contain rows and columns of pixels 90. The circuits of pixel array 92 (i.e., the rows and columns of pixel circuits for pixels 90) may be controlled using signals such as data line signals on data lines D and gate line signals on gate lines G. Data lines D and gate lines G are orthogonal. For example, data lines D may extend vertically and gate lines G may extend horizontally (i.e., perpendicular to data lines D).

Pixels 90 in pixel array 92 may contain thin-film transistor circuitry (e.g., polysilicon transistor circuitry, amorphous silicon transistor circuitry, semiconducting oxide transistor circuitry such as InGaZnO transistor circuitry, other silicon or semiconducting-oxide transistor circuitry, etc.) and associated structures for producing electric fields across liquid crystal layer 52 in display 14. Each display pixel may have one or more thin-film transistors. For example, each display pixel may have a respective thin-film transistor such as thin-film transistor 94 to control the application of electric fields to a respective pixel-sized portion 52' of liquid crystal layer 52.

The thin-film transistor structures that are used in forming pixels 90 may be located on a thin-film transistor substrate such as a layer of glass. The thin-film transistor substrate and the structures of display pixels 90 that are formed on the surface of the thin-film transistor substrate collectively form thin-film transistor layer 58 (FIG. 5).

Gate driver circuitry may be used to generate gate signals on gate lines G. The gate driver circuitry may be formed from thin-film transistors on the thin-film transistor layer or n be implemented in separate integrated circuits. The data line signals on data lines D in pixel array 92 carry analog image data (e.g., voltages with magnitudes representing pixel brightness levels). During the process of displaying images on display 14, a display driver integrated circuit or other circuitry may receive digital data from control circuitry and may produce corresponding analog data signals. The analog data signals may be demultiplexed and provided to data lines D.

The data line signals on data lines D are distributed to the columns of display pixels 90 in pixel array 92. Gate line signals on gate lines G are provided to the rows of pixels 90 in pixel array 92 by associated gate driver circuitry.

The circuitry of display 14 may be formed from conductive structures (e.g., metal lines and/or structures formed from transparent conductive materials such as indium tin oxide) and may include transistors such as transistor 94 of FIG. 6 that are fabricated on the thin-film transistor substrate layer of display 14. The thin-film transistors may be, for example, silicon thin-film transistors or semiconducting-oxide thin-film transistors.

As shown in FIG. 6, pixels such as pixel 90 may be located at the intersection of each gate line G and data line D in array 92. A data signal on each data line D may be supplied to terminal 96 from one of data lines D. Thin-film transistor 94 (e.g., a thin-film polysilicon transistor, an amorphous silicon transistor, or an oxide transistor such as a transistor formed from a semiconducting oxide such as indium gallium zinc oxide) may have a gate terminal such as gate 98 that receives gate line control signals on gate line G. When a gate line control signal is asserted, transistor 94 will be turned on and the data signal at terminal 96 will be passed to node 100 as voltage Vp. Data for display 14 may be displayed in frames. Following assertion of the gate line signal in each row to pass data signals to the pixels of that row, the gate line signal may be deasserted. In a subsequent display frame, the gate line signal for each row may again be asserted to turn on transistor 94 and capture new values of Vp.

Pixel 90 may have a signal storage element such as capacitor 102 or other charge storage elements. Storage capacitor 102 may be used to help store signal Vp in pixel 90 between frames (i.e., in the period of time between the assertion of successive gate signals).

Display 14 may have a common electrode coupled to node 104. The common electrode (which is sometimes referred to as the common voltage electrode, Vcom electrode, or Vcom terminal) may be used to distribute a common electrode voltage such as common electrode voltage Vcom to nodes such as node 104 in each pixel 90 of array 92. As shown by illustrative electrode pattern 104' of FIG. 6, Vcom electrode 104 may be implemented using a blanket film of a transparent conductive material such as indium tin oxide, indium zinc oxide, other transparent conductive oxide material, and/or a layer of metal that is sufficiently thin to be transparent (e.g., electrode 104 may be formed from a layer of indium tin oxide or other transparent conductive layer that covers all of pixels 90 in array 92).

In each pixel 90, capacitor 102 may be coupled between nodes 100 and 104. A parallel capacitance arises across nodes 100 and 104 due to electrode structures in pixel 90 that are used in controlling the electric field through the liquid crystal material of the pixel (liquid crystal material 52'). As shown in FIG. 6, electrode structures 106 (e.g., a display pixel electrode with multiple fingers or other display pixel electrode for applying electric fields to liquid crystal material 52') may be coupled to node 100 (or a multi-finger display pixel electrode may be formed at node 104). During operation, electrode structures 106 may be used to apply a controlled electric field (i.e., a field having a magnitude proportional to Vp-Vcom) across pixel-sized liquid crystal material 52' in pixel 90. Due to the presence of storage capacitor 102 and the parallel capacitances formed by the pixel structures of pixel 90, the value of Vp (and therefore the associated electric field across liquid crystal material 52') may be maintained across nodes 106 and 104 for the duration of the frame.

The electric field that is produced across liquid crystal material 52' causes a change in the orientations of the liquid crystals in liquid crystal material 52'. This changes the polarization of light passing through liquid, crystal material 52'. The change in polarization may, in conjunction with polarizers 60 and 54 of FIG. 5, be used in controlling the amount of light 44 that is transmitted through each pixel 90 in array 92 of display 14.

Figure 7:
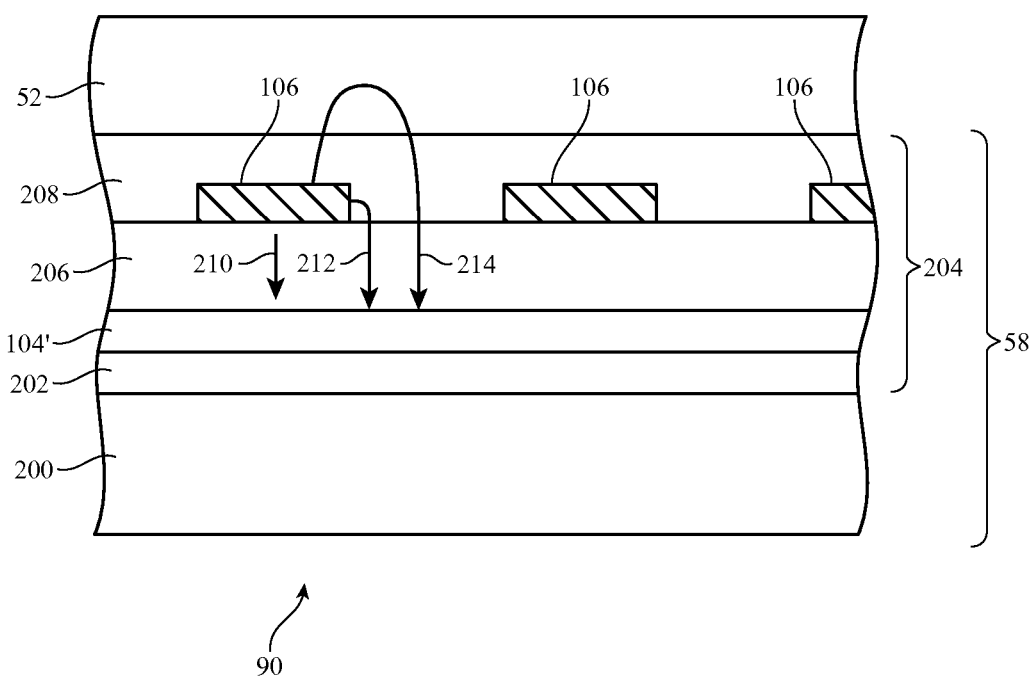
FIG. 7 is a cross-sectional side view of a portion of an illustrative display in accordance with an embodiment.

FIG. 7 is a cross-sectional side view of a portion of thin-film transistor layer 58 and an associated portion of liquid crystal layer 52 for an illustrative pixel 90 of display 14. Thin-film transistor layer 58 has a layer of thin-film transistor circuitry 204 on substrate 200. Substrate 200 may be formed from glass, ceramic, plastic, or other substrate material. Thin-film transistor circuitry 204 may include a layer of thin-film transistor structures 202. Vcom layer 104' may be formed on top of structures 202. Dielectric layers 206 and 208 may be formed on Vcom layer 104'. Electrodes 106 may be formed from a conductive material such as metal or a transparent conductive material such as indium tin oxide or indium zinc oxide and may be formed on dielectric layer 206 under layer 208. Dielectric layer 206 may be formed from a dielectric material such as silicon nitride or other inorganic material (as an example). Layer 208 may be totmed horn a dielectric material such as polyimide or other polymer (as an example). Layer 206 may sometimes be referred to as a passivation layer. Layer 208 may sometimes be referred to as an alignment layer. Liquid crystal layer 52 may be located between layer 58 and layer 56 (see, e.g., FIG. 5).

When voltage Vp is applied to electrodes 106, an electric field is produced that terminates on Vcom electrode layer 104'. As shown in FIG. 7, the electric field lines associated with electrodes 106 take three different paths through the structures of pixel 90. Some electric field lines such as line 210 may pass only through dielectric layer 206. Other electric field lines such as line 212 may pass through dielectric alignment layer 208 and dielectric passivation layer 206. Still other electric field lines such as line 214 may pass through a first portion of layer 208, layer 52, a second portion of layer 208, and laser 206.

Figure 8:
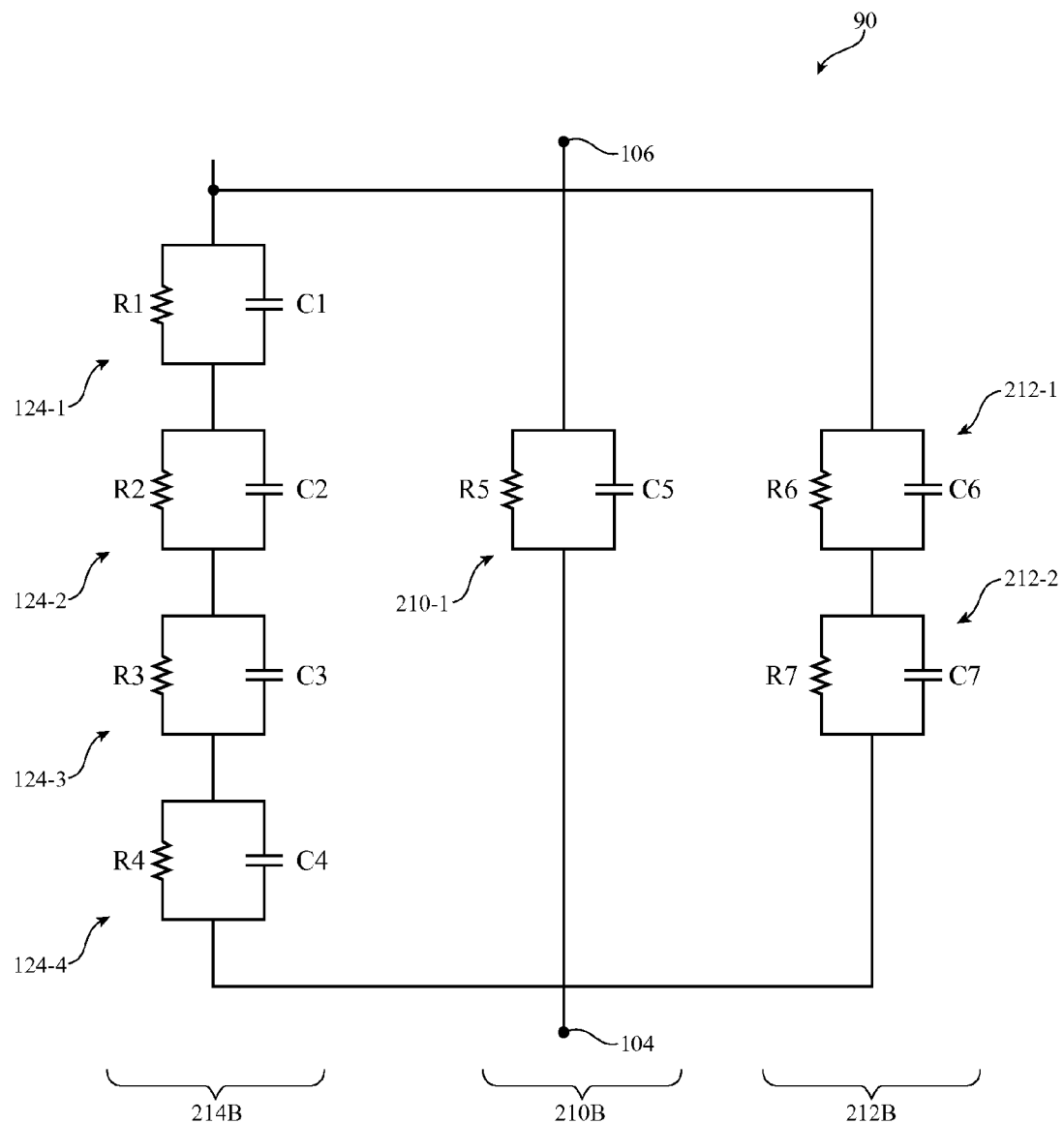
FIG. 8 is a circuit diagram illustrating resistances and capacitances associated with the display structures of FIG. 7 in accordance with an embodiment.

An equivalent circuit of pixel 90 of FIG. 7 is shown in FIG. 8. As shown in FIG. 8, pixel 90 is characterized by three different parallel branches—branch 214B (associated with electric field lines 214), branch 212B (associated with electric field lines 212), and branch 210B (associated with electric field lines 210). Each branch has a number of separate circuits (each with a parallel resistor and capacitor) corresponding to the layers traversed by the electric field lines. In branch 210B (which corresponds to storage capacitor 102 in pixel 90), circuit 210-1 contains parallel resistor R5 and capacitor C5, corresponding to the electrical behavior of pixel 90 arising from passage of electric field lines 210 through layer 206. In branch 212B, circuit 212-1 contains parallel resistor R6 and capacitor C6, corresponding to the electrical behavior of pixel 90 arising from passage of electric field lines 212 through layer 208 and contains parallel resistor R7 and capacitor C7, corresponding to the electrical behavior of pixel 90 arising from passage of electric field lines 212 through layer 206. In branch 214B, circuit 214-1 contains parallel resistor R1 and capacitor C1, corresponding to the electrical behavior of pixel 90 arising from passage of electric field lines 214 through layer 208 a first time, contains parallel resistor R2 and capacitor C2, corresponding to the electrical behavior of pixel 90 arising from passage of electric field lines 214 through layer 52, contains parallel resistor R3 and capacitor C3, corresponding to the electrical behavior of pixel 90 arising from passage of electric field lines 214 through layer 208 a second time, and contains parallel resistor R4 and capacitor C4, corresponding to the electrical behavior of pixel 90 arising from passage of electric field lines 214 through layer 206.

The series-connected resistors in each branch and the series connected capacitors in each branch form voltage dividers. For example, resistors R1, R2. R3, and R4 form a resistor-based voltage divider in branch 214B and capacitors C1, C2, C3, and C4 form a parallel capacitor-based voltage divider. The values of R1, R2, R3, and R4 and the values of C1, C2, C3, and C4 can be adjusted by adjusting the materials and thicknesses of the structures in pixel 90. In a conventional display, the values of R1, R2, R3, and R4 may be about 250 GΩ, 10,000 GΩ, 187 GΩ, and 3750 GΩ and the values of C1, C2, C3, and C4 might be about 14.2 nF, 0.35 nF. 18.8 nF, and 15 nF.

Figure 9:
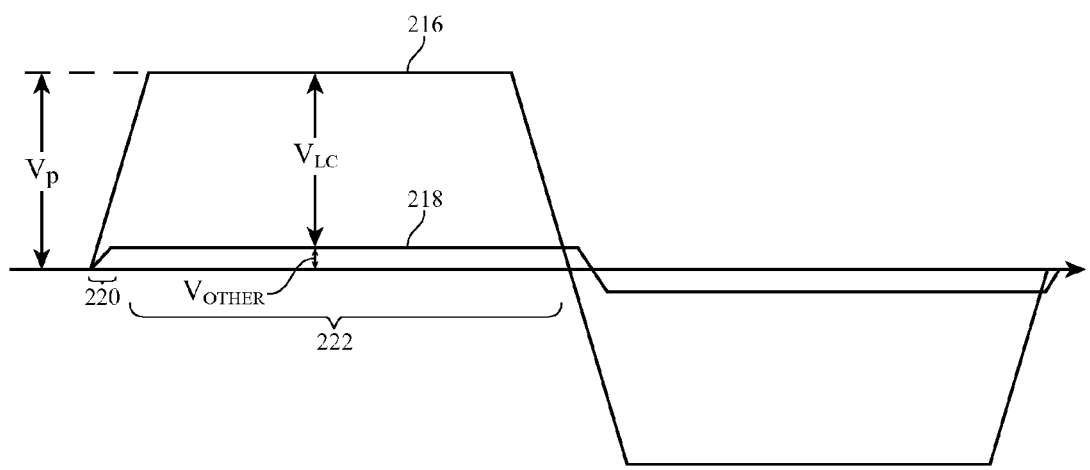
FIG. 9 is a graph showing how pixel voltages may be distributed among the layers of a display in accordance with an embodiment.

FIG. 9 is a graph of an illustrative pixel voltage Vp being applied to a given pixel 90 as a function of time (curve 216). The polarity of Vp may be alternated as a function of time to help reduce charge accumulation. As shown in FIG. 9, the applied voltage of curve 216 is composed of two portions. A first portion of curve 216 corresponds to the amount of voltage Vp that is applied across liquid crystal layer 52 (see, e.g., circuit 214-2 of FIG. 8). The second portion of curve 216 (i.e., curve 218) corresponds to the amount of voltage Vp that is applied across the other layers of pixel 90 (Vother) and is associated with the voltages across circuits 214-1, 214-3, and 214-4. Smaller magnitudes of Vother are associated with minimized display flicker. At higher (AC) frequencies, the capacitors dominate and divide the voltage, as shown in portion 220 of curve 218. At lower (DC) frequencies, the resistors dominate and divide the voltage, as shown by portion 222 of curve 218.

The shape of curve 218 (i.e., the steadiness of Vlc as a function of time) is dictated by the values of R1, R2, R3, R4, C1, C2, C3, and C4 in circuit 214B. It has been determined that charge accumulation that can lead to undesired fluctuations in Vlc and display flickering can be reduced by reducing the value of R4, so as to minimize differences in the voltages at the nodes between layers that arise from deviations between the voltage divider behavior of the resistor-based voltage divider and capacitor-based voltage divider. In particular, it has been determined that reductions should be made in the layer thickness for layer 206 in the portions of pixel 90 where electric field lines 214 traverse layer 206 (i.e., in the portions of layer 206 not directly overlapped by electrodes 106) in order to reduce display flicker. With one suitable arrangement, all of layer 206 between electrodes 106 is removed by forming trenches in layer 206 that extend to layer 104'. With another suitable arrangement, part of layer 206 between electrodes 106 is removed by forming trenches in layer 206 that extend only partway into layer 206.

Figure 10:
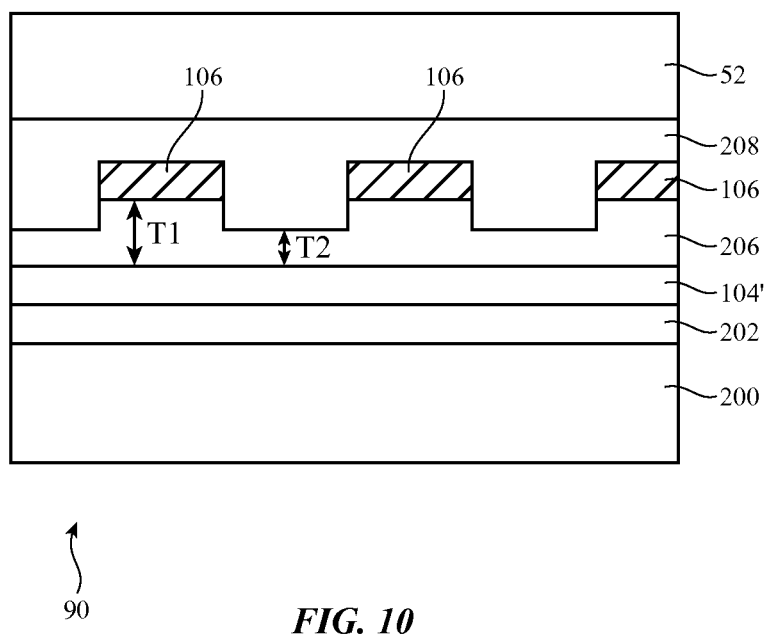
FIG. 10 is a cross-sectional side view of a portion of an illustrative thin-film transistor layer in which a dielectric layer has been partly removed in selected trench areas between pixel electrodes in accordance with an embodiment.

FIG. 10 is a cross-sectional side view of pixel 90 showing how layer 206 (e.g., a silicon nitride layer or other dielectric passivation layer on Vcom layer 104') may be partly removed by forming trenches in layer 206 that extend partway into layer 206. With this type of arrangement, layer 206 has a first thickness T1 in the portions of layer 206 that are overlapped by electrodes 106 and has a second thickness T2 that is less than T1 in the portions of layer 206 that are not overlapped by electrodes 106 (i.e., layer 206 has thickness T2 in between electrodes 106). As a result, layer 208 may be thinner where layer 208 overlaps electrodes 106 than where layer 208 lies between electrodes 106 and does not overlap electrodes 106 (even neglecting the thickness of electrodes 106 themselves).

Figure 11:
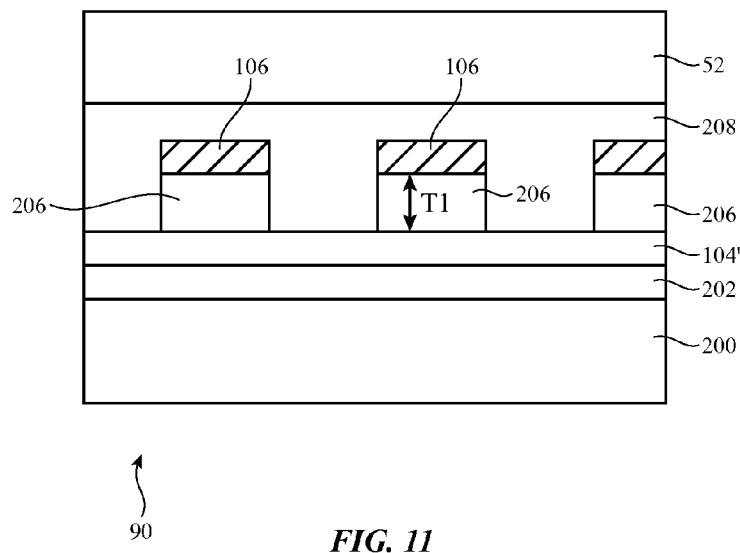
FIG. 11 is a cross-sectional side view of a portion of an illustrative thin-film transistor layer in which a dielectric layer has been completely removed in selected trench areas between pixel electrodes in accordance with an embodiment.

FIG. 11 is a cross-sectional side view of pixel 90 showing how layer 206 may be fully removed between electrodes 106. With this type of arrangement, layer 206 has thickness T1 in the portions of layer 206 that are overlapped by electrodes 106 and is completely absent in the areas that are not overlapped by electrodes 106 (i.e., pixel 90 is free of layer 206 in between electrodes 106 due to the formation of trenches in layer 206 that extend to layer 104').

Figure 12:
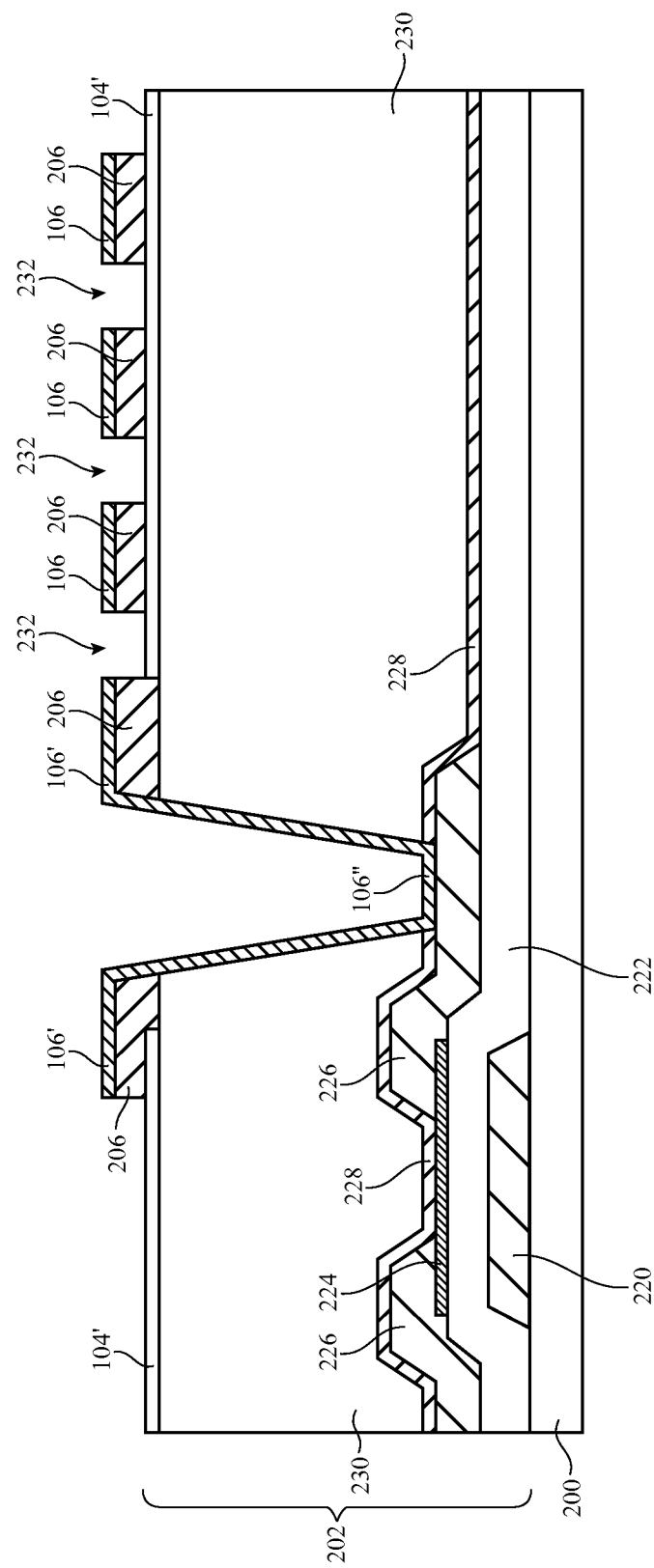
FIG. 12 is a cross-sectional side view of a portion of a display showing how a common voltage electrode layer may serve as an etch stop when removing portions of the dielectric layer of FIG. 11 in accordance with an embodiment.

Layer 206 may be selectively thinned by using patterned electrode structures 106 as an etch mask during etching operations. This type of approach is illustrated in FIG. 12. As shown in FIG. 12, pixel 90 may be formed by depositing and patterning thin-film transistor structures 202 on the surface of substrate 200. Thin-film transistor structures 202 may include transistor gate 220, gate insulator layer 222, transistor active region (channel region) 224, source-drain electrodes 226, and dielectric passivation layer 228. Electrodes 106 may be formed from a layer of transparent conductive material (e.g., a conductive oxide) such as indium tin oxide (ITO) or indium zinc oxide (IZO). A global layer of electrode material may be deposited and patterned using photolithography and wet etching (as an example).

Planarization layer 230 (e.g., a polymer layer or other suitable dielectric layer) may have an opening that allows portions 106' and 106" of the electrode layer to form a short circuit with source-drain electrode 226 through an opening in planarization layer 228. The other portions of patterned electrode 106 may form a set of electrode fingers for pixel 90. After electrode fingers 106 have been patterned (e.g., using photolithography and wet etching), a dry etching operation may be performed.

During dry etching, electrodes 106 serve as a dry etch mask and protect underlying portions of layer 206. As shown in FIG. 12, this allows the dry etch process to form trenches 232 in layer 206 in the exposed areas between respective electrodes 106. Trenches 232 in layer 206 may penetrate partway into layer 206 (e.g., to form a topology of the type shown by layer 206 of FIG. 10 in which layer 206 is only partly removed between electrodes 106) or may penetrate completely through layer 206 (e.g., to form a topology of the type shown by layer 206 of FIGS. 11 and 12 in which layer 206 is completely removed between electrodes 106).

As shown in FIG. 12, Vcom layer 104' may lie on the surface of planarization layer 230 and may serve as an etch stop layer that arrests dry etching of trenches 232. Due to the etch stop functionality of layer 104', dry etching will not penetrate into layer 230 during formation of trenches 232. The depth of trenches 232 may be adjusted to adjust the value of resistance R4 of circuit 214B of FIG. 8. Minimum resistance was be achieved by complete removal of layer 206 in trenches 232. Less resistance reduction may be achieved with partial removal of layer 206 in trenches 232. When partly removing layer 206, portions of layer 206 that remain at the bottom of trenches 232 may help eliminate the risk of short circuits between electrodes 106 and Vcom layer 104' that could arise from particles in polyimide layer 208. If desired, other configurations may be used for forming pixels 90 that help reduce flicker for display 14. The arrangement of FIG. 12 is merely illustrative.

Figure 13:
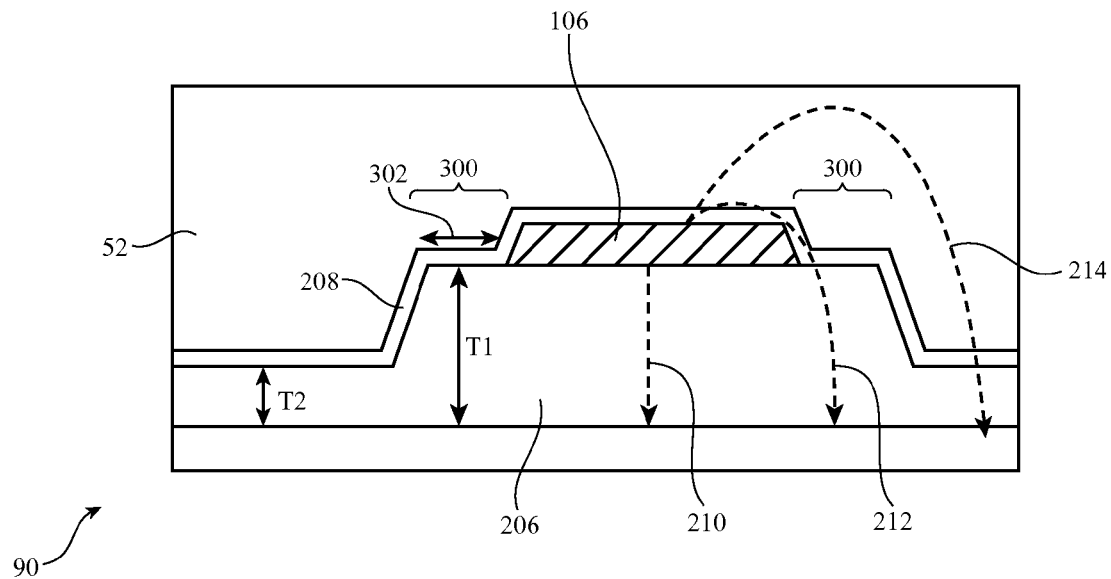
FIG. 13 is a cross-sectional side view of a portion of an illustrative thin-film transistor layer in which a dielectric layer has been partly removed in selected trench areas between pixel electrodes and in which the unremoved dielectric layer has a shoulder portion that is uncovered by electrode material in accordance with an embodiment.

FIG. 13 is a cross-sectional side view of a portion of an illustrative thin-film transistor layer in which dielectric layer 206 has been partly removed in selected trench areas between pixel electrodes 106. In the illustrative configuration of FIG. 13, electrodes 106 cover only a central portion of the unremoved dielectric of layer 206, leaving uncovered dielectric shoulder regions 300 of width 302 (e.g., about 0.5 to 1.5 microns or other suitable shoulder width). With configurations of the type shown in FIG. 13, dielectric layer 206 has unetched portions (protrusions) between each pair of trenches in layer 206 and each protrusion supports a corresponding electrode 106 that is recessed from the trenches. Because each electrode 106 is recessed from the edges of an unetched portion of layer 206, shoulder portions 300 that are uncovered by the electrode 106 are formed on the unetched protruding portion of layer 206.

Figure 14:
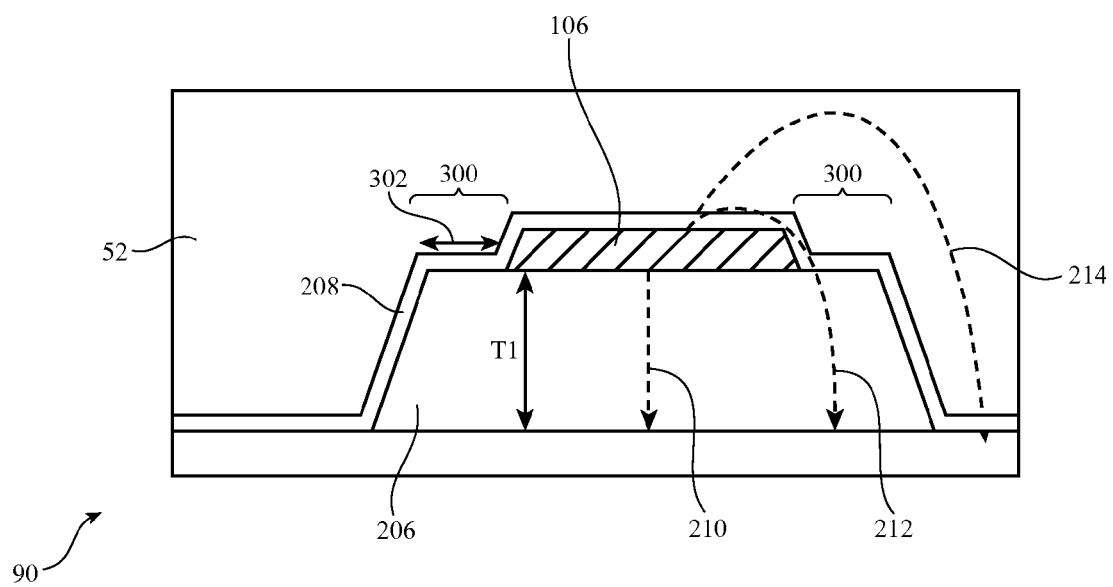
FIG. 14 is a cross-sectional side view of a portion of an illustrative thin-film transistor layer in which a dielectric layer has been completely removed in selected trench areas between pixel electrodes and in which the unremoved dielectric layer has a shoulder portion that is uncovered by electrode material in accordance with an embodiment.

In the example of FIG. 14, shoulders 300 have been formed on a protruding unetched portion of dielectric layer 206 in a configuration in which dielectric layer 206 has been completely removed in selected trench areas between pixel electrodes 106.

Figure 15:
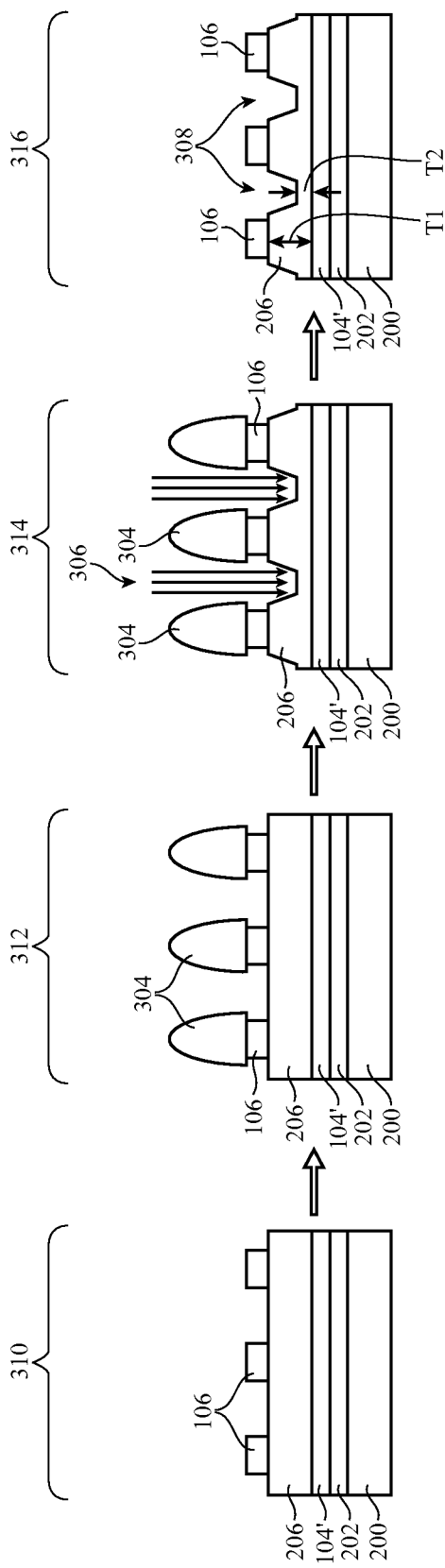
FIG. 15 is a diagram of illustrative steps involved in forming structures of the type shown in FIG. 13 in accordance with an embodiment.

A diagram of illustrative steps in involved in forming structures of the type shown in FIG. 13 is shown in FIG. 15. Initially (step 310), electrodes 106 are patterned (e.g., using an ITO etch). At step 312, photoresist 304 is deposited and patterned photolithographically to cover electrodes 106 while leaving the spaces between electrodes 106 uncovered. At step 314, dry etchant 306 (e.g., silicon nitride etchant) is used to etch partway into layer 206, forming trenches 308 (step 316). Photoresist 304 serves as a mask layer during etching and is stripped after etching. As shown in step 316, material in layer 206 of thickness T2 may remain at the bottom of trenches 308.

Figure 16:
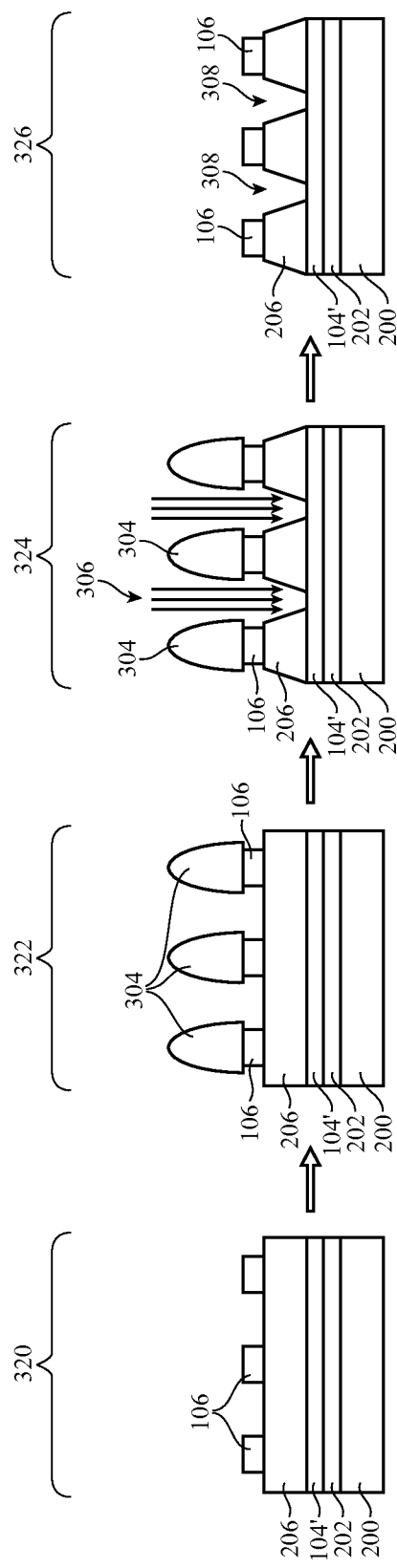
FIG. 16 is a diagram of illustrative steps involved in forming structures of the type shown in FIG. 14 in accordance with an embodiment.

A diagram of illustrative steps in involved in forming structures of the type shown in FIG. 14 is shown in FIG. 16. Initially (step 320), electrodes 106 are patterned (e.g., using an ITO etch). At step 322, photoresist 304 is deposited and patterned lithographically to cover electrodes 106 while leaving the spaces between electrodes 106 uncovered. At step 324, dry etchant 306 (e.g., silicon nitride etchant) is used to etch fully through layer 206, forming trenches 308 (step 326). Photoresist 304 serves as a mask layer during etching and is stripped after etching. As shown in step 326, none of material 206 remains at the bottom of trenches 308.

Figure 17:
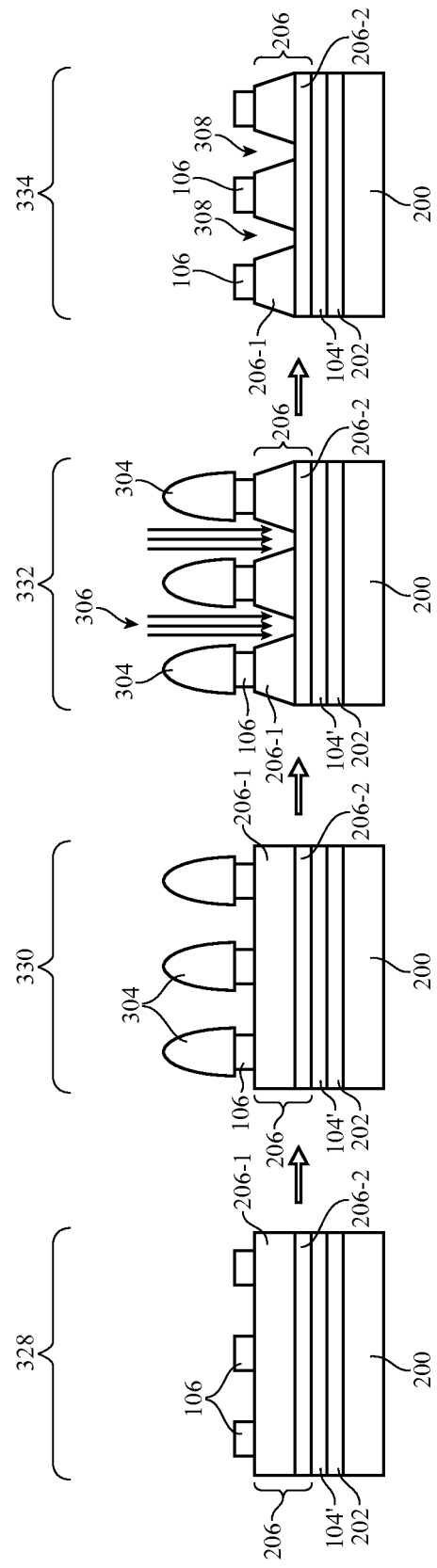
FIG. 17 is a diagram of illustrative steps involve in forming structures of the type shown in FIG. 16 in a configuration in which the patterned dielectric layer under the electrodes has been formed from multiple sublayers in accordance with an embodiment.

If desired, layer 206 may include two sublayers: upper sublayer 206-1 (e.g., a silicon nitride layer) and lower sublayer 206-2 (e.g., silicon oxide or a low K material such as hafnium oxide, etc.), as shown in FIG. 17. The diagram of FIG. 17 shows illustrative steps involved in forming structures of the type shown in FIG. 14 (fully etched trenches). At step 328, electrodes 106 are patterned (e.g., using an ITO etch). At step 330, photoresist 304 is deposited and patterned photolithographically to cover electrodes 106 while leaving the spaces between electrodes 106 uncovered. At step 332, dry etchant 306 (e.g., silicon nitride etchant) is used to etch fully through layer 206-1, forming trenches 308 (step 326). During etching, lower sublayer 206-2 may serve as an etch stop (i.e., layer 104' need not serve as an etch stop). As shown in step 334, none of material 206-1 remains at the bottom of trenches 308.

The foregoing is merely illustrative and various modifications can be made by those skilled in the art without departing from the scope and spirit of the described embodiments. The foregoing embodiments may be implemented individually or in any combination.

What is claimed is:

1. A liquid crystal display having an array of pixels; upper and lower display layers; and
a layer of liquid crystal material between the upper and lower display layers, wherein a selected one of the upper and lower display layers comprises:
a substrate;
thin-film transistor structures on the substrate;
a conductive layer on the thin-film transistor structures;
a dielectric layer on the conductive layer; and
a pixel electrode on the dielectric layer that is separated from the conductive layer by the dielectric layer, wherein the pixel electrode includes a plurality of electrode fingers, wherein the dielectric layer includes trenches between the electrode fingers, and wherein the trenches extend to the conductive layer so that areas between the electrode fingers are free of the dielectric layer.

2. The liquid crystal display defined in claim 1 wherein the conductive layer forms a common voltage electrode.

3. The liquid crystal display defined in claim 2 wherein the dielectric layer comprises silicon nitride.

4. The liquid crystal display defined in claim 2 wherein the dielectric layer comprises a layer of a first dielectric material on a layer of a second dielectric material.

5. The liquid crystal display defined in claim 4 wherein the first dielectric material is silicon nitride.

6. The liquid crystal display defined in claim 5 wherein the second dielectric material is silicon oxide.

7. The liquid crystal display defined in claim 5 wherein the second dielectric material is a low K dielectric.

8. The liquid crystal display defined in claim 1 wherein the dielectric layer comprises silicon nitride.

9. The liquid crystal display defined in claim 1 further comprising a polymer layer that covers the electrode fingers and that has portions that extend into the trenches.

10. The liquid crystal display defined in claim 9 wherein the polymer comprises polyimide.

11. The liquid crystal display defined in claim 1 wherein the conductive layer comprises a conducting oxide that serves as an etch stop.

12. The liquid crystal display defined in claim 11 wherein the electrode fingers are formed from a conductive oxide selected from the group consisting of: indium tin oxide and indium zinc oxide and wherein the conductive layer is formed from a conductive oxide selected from the group consisting of: indium tin oxide and indium zinc oxide.

13. The liquid crystal display defined in claim 1 wherein the selected one of the display layers is the lower display layer.

14. The liquid crystal display defined in claim 13 wherein the upper display layer comprises a color filter layer.

15. The liquid crystal display defined in claim 14 wherein the dielectric layer has unetched portions between the trenches and wherein the electrode fingers are recessed from the trenches to form shoulder portions on the dielectric layer that are uncovered by the electrode fingers.

16. A liquid crystal display having an array of pixels; first and second opposing display layers having respective first and second substrates; and
a layer of liquid crystal material between the first and second display layers, wherein the first display layer comprises:
thin-film transistor structures on the first substrate;
a conductive layer on the thin-film transistor structures;
a dielectric layer on the conductive layer; and
a pixel electrode on the dielectric layer that is separated from the conductive layer by the dielectric layer, wherein the pixel electrode is patterned to include electrode fingers, wherein there are trenches in the dielectric layer between the electrode fingers, wherein the dielectric layer has unetched portions between the trenches, and wherein the electrode fingers are recessed from the trenches to form shoulder portions on the dielectric layer that are uncovered by the electrode fingers.

17. The liquid crystal display defined in claim 16 wherein the thin-film transistor structures include thin-film transistors covered with a planarization layer.

18. The liquid crystal display defined in claim 17 wherein the conductive layer comprises a transparent conductive layer on the planarization layer.

19. The liquid crystal display defined in claim 18 wherein the dielectric layer has a first thickness under the electrode fingers and wherein the trenches extend only partway to the transparent conductive layer so that the transparent conductive layer is covered with the dielectric layer to a second thickness that is less than the first thickness in areas between the electrode fingers.

20. The liquid crystal display defined in claim 18 wherein the trenches extend to the transparent conductive layer.

21. A liquid crystal display having an array of pixels;
a color filter layer;
a thin-film transistor layer having thin-film transistor structures on a substrate;
a layer of liquid crystal material between the color filter layer and the thin-film transistor layer;
a planarization layer on the thin-film transistor structures;
a transparent conductive layer on the planarization layer that carries a common electrode voltage;
a dielectric layer on the transparent conductive layer;
a pixel electrode on the dielectric layer, wherein the pixel electrode comprises electrode fingers, and wherein the dielectric layer has a first thickness under the electrode fingers and has a second thickness between the electrode fingers that is less than the first thickness; and
a polymer layer that covers the electrode fingers and that has portions that extend into the trenches.

22. The liquid crystal display defined in claim 21 wherein the dielectric layer comprises a layer of silicon nitride with trenches between the electrode fingers.

* * * * *